United States Patent [19]
Aota

[11] Patent Number: 5,938,924
[45] Date of Patent: Aug. 17, 1999

[54] FILTER

[75] Inventor: Mitsuhiro Aota, Kanagawa, Japan

[73] Assignee: Unisia Jecs Corporation, Atsugi, Japan

[21] Appl. No.: 08/852,443

[22] Filed: May 7, 1997

[30] Foreign Application Priority Data

May 21, 1996 [JP] Japan .................................. 8-125743

[51] Int. Cl.⁶ ................................................. B01D 29/00
[52] U.S. Cl. .................... 210/497.01; 210/499; 29/896.6
[58] Field of Search ............................. 210/456, 497.01, 210/499, 455; 29/896.6

[56] References Cited

U.S. PATENT DOCUMENTS

| | | |
|---|---|---|
| 524,668 | 8/1894 | Hawkins . |
| 1,941,982 | 1/1934 | Gill . |
| 3,356,226 | 12/1967 | Miller, Jr. et al. ...................... 210/457 |
| 5,102,436 | 4/1992 | Grabowski ................................ 55/483 |
| 5,169,524 | 12/1992 | Meiritz et al. ........................... 210/232 |
| 5,290,446 | 3/1994 | Degen et al. ............................ 210/489 |
| 5,599,449 | 2/1997 | Gnamm et al. .......................... 210/495 |
| 5,664,628 | 9/1997 | Koehler et al. .......................... 166/369 |

FOREIGN PATENT DOCUMENTS 5-96477  12/1993  Japan .

*Primary Examiner*—David A. Reifsnyder
*Attorney, Agent, or Firm*—Foley & Lardner

[57] ABSTRACT

A filter for filtering oil flowing through a fluid flow passage extending through the inside and outside of a plug forming part of a relief valve of a vane pump. The filter comprises a roll-shaped sheet formed of steel sheet spring and taking a generally cylindrical form. The roll-shaped sheet has overlapping first and second end sections, which are opposite to each other in a peripheral direction of the roll-shaped sheet. The roll-shaped sheet is located in the fluid flow passage and fitted on an outer peripheral surface of the cylindrical member. The roll-shaped sheet is formed with many through-holes having the size to allow the fluid to pass through the through-holes but trap particles for removal.

7 Claims, 3 Drawing Sheets

FILTER

BACKGROUND OF THE INVENTION

1. Field of the Invention

This invention relates to improvements in a filter for trapping impurities or particles contained in a fluid such as oil, more particularly to the improvements in a filter adapted to filter the fluid to flow through a fluid flow passage extending through inside and outside of a cylindrical member.

2. Description of the Prior Art

A filter for filtering oil flowing through an oil flow passage extending the inside and outside of a plug forming part of a pressure relief valve is disclosed in Japanese Utility Model Provisional Publication No. 5-96477, in which oil is released through the relief valve disposed in the oil flow passage from a vane pump in a power steering system of an automotive vehicle for the purpose of pressure relief. Such a filter 20 is shown in FIGS. 4 and 5: A wire gauze is formed generally cylindrical and provided at its opposite ends with inner flange sections 21A, 21A, which are bent, and then annular retainers 22, 22 are caulked and installed respectively to the inner flange sections 21A, 21A. This filter 20 is used for fitting on the cylindrical section 30A' of a plug. The which cylindrical section 30A' is formed with an oil passage 30B' forming part of the oil flow passage through which oil is released for the pressure relief purpose. The filter 20 is located to cover the inlet side of the oil passage 30B' to trap impurities or particles contained in oil flowing through this oil passage 30B'.

However, difficulties have been encountered in the above-discussed conventional filter 20, in which the filter 20 is complicated in structure and difficult in production because of requiring caulking so that it unavoidably becomes large-sized, requiring a high production cost. Additionally, it is required to prepare many filters having different inner diameters, for the plugs 30' having different sizes of the cylindrical sections 30A'. Furthermore, when the filter 20 is fitted on the cylindrical section 30A', it is required to align the both axes of the filter 20 and the cylindrical section 30A' thereby making troublesome the operation of fitting the filter on the cylindrical section 30A'.

SUMMARY OF THE INVENTION

It is an object of the present invention to provide an improved filter for filtering fluid to flow through a fluid flow passage extending through inside and outside of a cylindrical member, which filter can overcome drawbacks encountered in similar conventional filters.

Another object of the present invention is to provide an improved filter for filtering fluid to flow through a fluid flow passage extending inside and outside of a cylindrical member, which filter is simple in construction and easy in installation to the cylindrical member while the same filter can be fitted on various cylindrical members having different sizes.

A further object of the present invention is to provide an improved filter for filtering fluid to flow through a fluid flow passage extending through inside and outside of a cylindrical member, which filter is small-sized to facilitate production thereof, lowering a production cost thereof.

A filter according to the present invention is for filtering fluid flowing through a fluid flow passage extending through inside and. outside of a cylindrical member. The filter comprises a roll-shaped sheet formed of a sheet material having an elasticity and taking a generally cylindrical form. The roll-shaped sheet has first and second end sections, which are opposite to each other in a peripheral direction of the roll-shaped sheet and overlap. The roll-shaped sheet is located in the fluid flow passage and fitted on an outer peripheral surface of the cylindrical member. The roll-shaped sheet is formed with a plurality of through-holes having a size to allow the fluid to pass through the through-holes and to trap particles to be removed.

According to the present invention, the filter is simplified in structure, and small-sized thereby facilitating production and lowering production cost. Additionally, the filter can be readily installed in position by virtue of the elasticity of the sheet material thereby to facilitate the installation operation. Furthermore, since the filter is changeable in its inner diameter by virtue of the elasticity of the sheet material, the filter can be fitted on a variety of cylindrical members having different diameters.

DETAILED DESCRIPTION OF THE INVENTION

Figure 1:
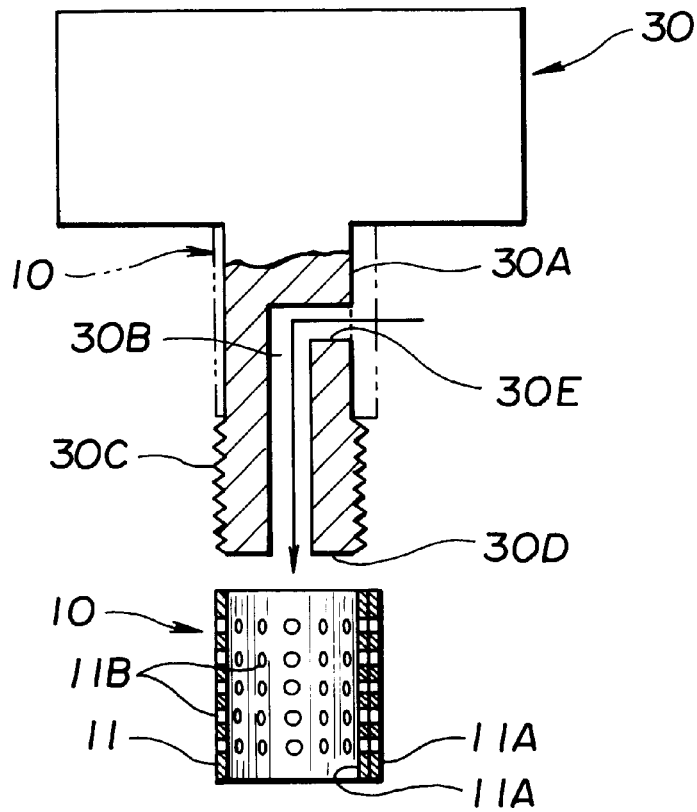
FIG. 1 is a front elevation, partly in section, showing a locational relationship between a plug and an embodiment of a filter according to the present invention.
Figure 2:
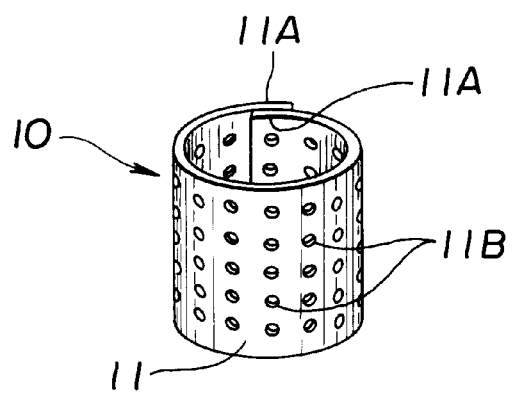
FIG. 2 is a perspective view of the filter of FIG. 1.
Figure 3:
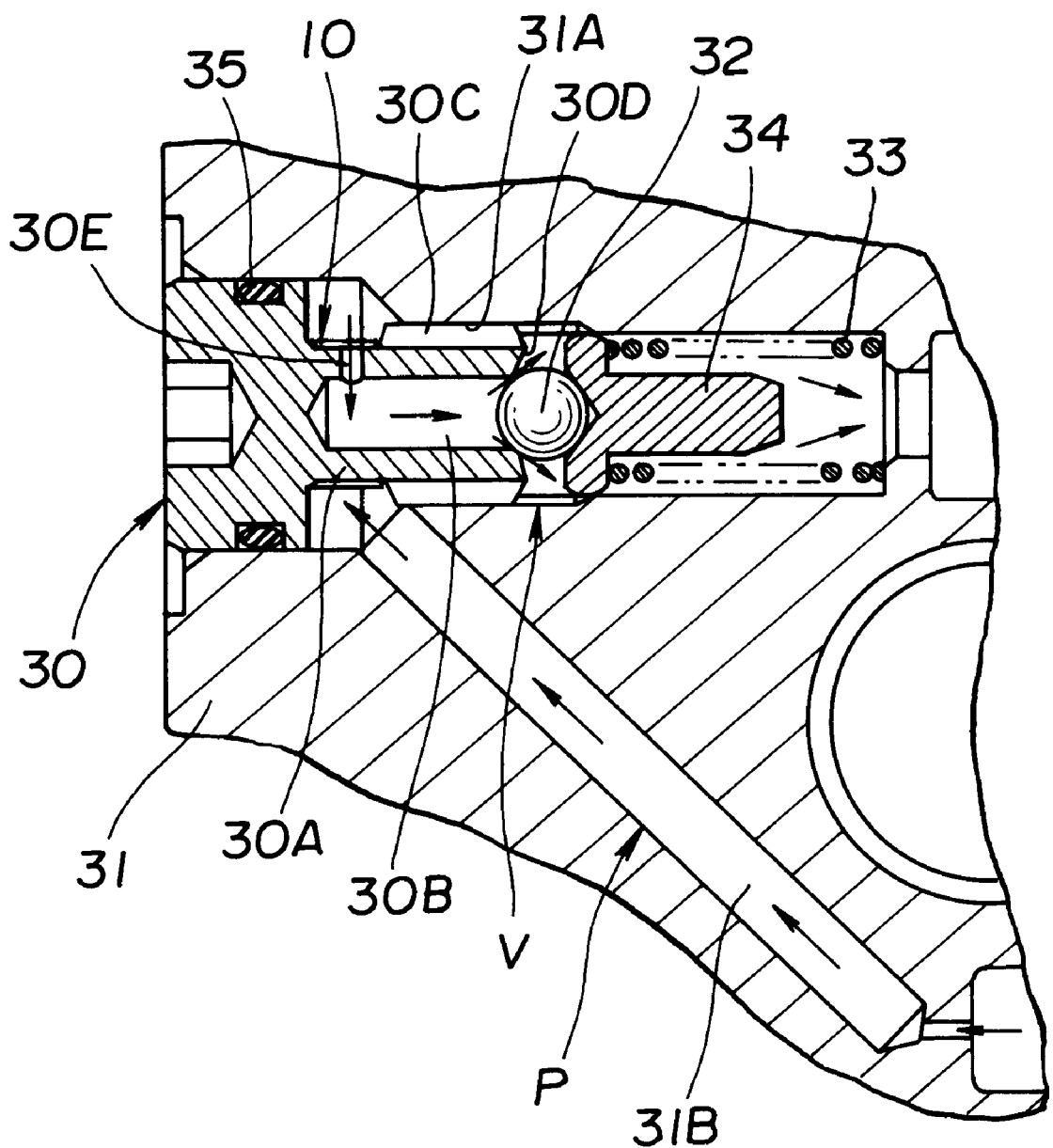
FIG. 3 is a fragmentary cross-sectional view of a part of a vane pump, showing an installation state of the filter of FIG. 1.
Figure 4:
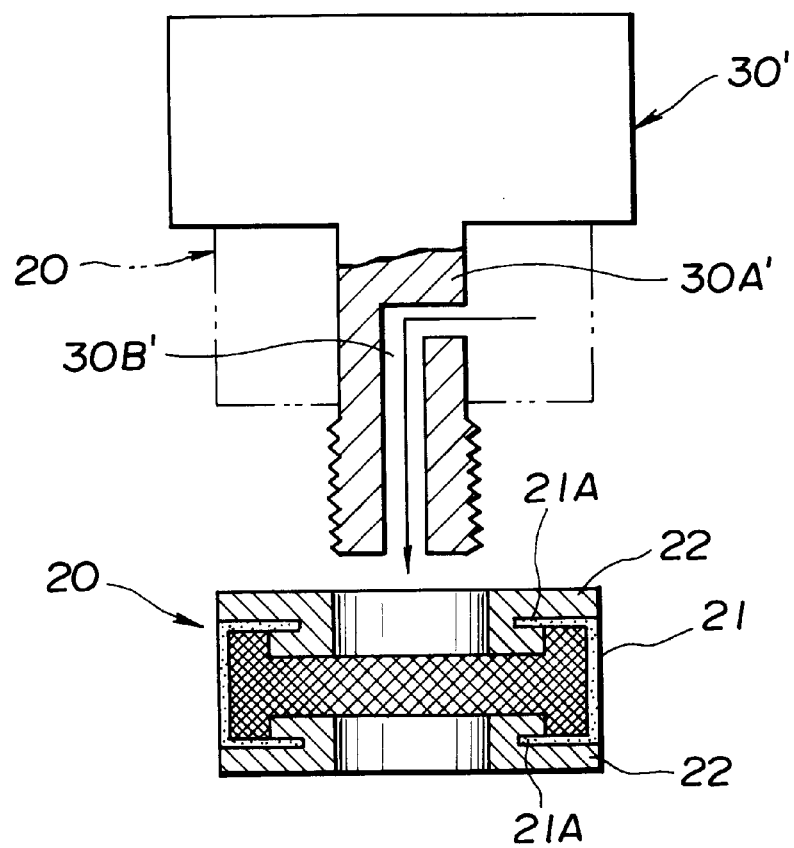
FIG. 4 is a front elevation, partly in section, showing a locational relationship between a plug and a conventional filter.
Figure 5:
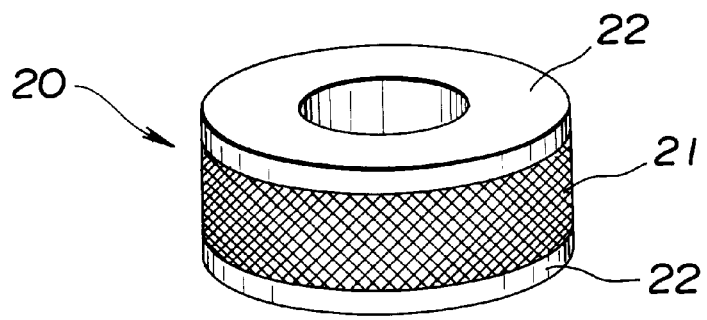
FIG. 5 is a perspective view of the conventional filter of FIG. 4.

Referring now to FIGS. 1 to 3, a preferred embodiment of a filter according to the present invention is illustrated by the reference numeral 10. The filter 10 is formed of a steel sheet (sheet spring) 11 and produced by forming the steel sheet 11 of the elongate rectangular shape into a roll (or cylinder) as shown in FIG. 2. The cylindrical roll-shaped filter medium or steel sheet 11 has opposite end sections 11A, 11A in the peripheral direction thereof. The end sections 11A, 11A overlap. It is to be noted that the end sections 11A, 11A are substantially in contact with each other. The steel sheet 11 is formed with many small or fine holes (through-holes) 11B each of which has a size or diameter to allow oil to flow therethrough and prevent impurities or particles from flowing therethrough. It will be understood that the cylindrical or roll-shaped filter 10 can be increased in its inner diameter because of the elasticity of the sheet spring 11.

An example of use of the filter 10 will be discussed with reference to FIG. 1 and 3, in which the filter 10 is installed to a plug 30 forming part of a bane pump for a power steering system of an automotive vehicle. The filter 10 is generally coaxially fitted on a cylindrical section 20A of the plug 20 as indicated in phantom in FIG. 1. When the filter 10 is to be fitted in position from the lower side of the plug 30 as shown in FIG. 1, the filter 10 is slightly increased in inner diameter by virtue of the elasticity of the sheet spring 11 and moved toward the cylindrical section 20A through an externally threaded section 30C which is slightly larger in outer diameter than the cylindrical section 20A. Thus, the filter 10 can be easily fitted on the cylindrical section 20A of the plug 30. It is to be noted that the common filter 10 can be fitted on various cylindrical sections (20A) having different diameters by virtue of the fact that the filter 10 can be increased in inner diameter. It will be understood that the end sections 11A, 11A are kept to be substantially in contact with each other under a condition where the filter 10 is fitted on the cylindrical section 20A of the plug 10.

As shown in FIG. 3, the plug 30 provided with the filter 10 is installed to a casing 31 of the vane pump for the power steering system of the automotive vehicle thereby to constitute a relief valve V for the vane pump. Specifically, the plug 30 is screwed into a cylindrical bore (no numeral) formed in the vane pump casing 31 in a manner that the externally threaded section 30C is engaged with an internal thread portion 31A formed in the cylindrical bore, so that the plug 30 is securely installed to the casing 31. The cylindrical bore is merged into a large diameter bore (no numeral) in which a head (no numeral) of the plug 30 is located, in which a seal ring 35 is fitted in a peripherally extending groove (no numeral) formed at the peripheral surface of the head in order to maintain an oil tight seal between the head of the plug 30 and the inner surface of the casing 31 defining the large diameter bore.

The tip end of the externally threaded section 30C is located facing the tip end of a retainer 34, which is slidably disposed in the cylindrical bore and biased toward the tip end of the externally thread section 30C by a spring 33. A ball 32, as a valve member, is movably disposed between the tip ends of the externally threaded section 30C and the retainer 34. The tip end of the externally threaded section 30C of the plug 30 is formed with a valve seat 30D on which the ball 32 is to be seated upon being pushed by the retainer 34. The plug 30 is formed with a central oil passage 30B, which extends throughout the cylindrical section 30A and the externally threaded section 30C. The valve seat 30D is annular so that an end section of the oil passage 30B is formed through a central opening of the valve seat 30D. The central oil passage 30B is communicated through a side opening 30E (formed in the cylindrical section 30A) with an oil passage 31B formed in the pump casing 31. The central oil passage 30B, the side opening 30E, and the oil passage 31B form part of an oil flow passage P through which oil from the vane pump is released for the pressure relief purpose. Thus, the relief valve V includes the plug 30, the ball 32, the retainer 34, and the spring 33, and is disposed in the oil flow passage P through which pressurized oil can be released.

When the pressure of oil discharged from the vane pump exceeds a predetermined level, the ball 32 and the retainer 34 are moved against the bias of the spring 33 so that the ball 32 becomes separated from the valve seat 30D. As a result, oil upstream the valve seat 30D is released to the downstream side of the valve seat 30D so that oil flow is established in the direction indicated by arrows in FIGS. 1 and 3. Thus, the filter 10 is located to cover the side opening 30E and therefore is disposed in the oil flow passage P through which oil is released, so that the filter 10 can filter oil flowing through the oil flow passage P to trap impurities or particles in oil. During filtering oil, the end sections 11A, 11A overlap, and therefore the whole peripheral surface of the cylindrical section 30A of the plug 10 is necessarily covered with the sheet spring 11 of the filter 10. Thus, oil flowing through the side opening 30E formed at the cylindrical section 30A into the central oil passage 30B is effectively filtered to remove impurities or particles from oil. By virtue of elasticity of the sheet spring 11 of the filter 10 to built up a restoration force in a direction of decreasing the diameter of the filter 10, the filter 10 can be brought into close contact with the peripheral surface of the cylindrical section 30A of the plug 30, thereby preventing oil from flowing bypassing the filter 10 thus more securely removing impurities or particles in oil flowing through the oil flow passage P.

While the filter 10 has been shown and described as being used only for the relief valve V, it will be understood that the filter 10 may be extensively used to be installed on the outer peripheral surface of a variety of cylindrical members each of which is formed with an oil passage through which the inside and the outside of the cylindrical member is in communication with each other.

What is claimed is:

1. A filter arrangement for filtering fluid comprising:
   a plug having a cylindrical member having a fluid flow passage extending through said cylindrical member; and
   a roll-shaped sheet consisting of a single sheet material with a plurality of through-holes, having an elasticity, and taking a generally cylindrical form, wrapped directly on an outer peripheral surface of said cylindrical member, said roll-shaped sheet having first and second opposite end sections that overlap in a peripheral direction of the roll-shaped sheet, said first and second end sections being movable relative to each other so that a diameter of said roll-shaped sheet is variable, said through-holes being sized to allow the fluid to pass through said through-holes and into said fluid flow passage to trap particles for removal.

2. A filter arrangement as claimed in claim 1, wherein said roll-shaped sheet is changeable in inner diameter altering an overlapping state of the first and second end sections of said roll-shaped sheet under an elastic deformation of said roll-shaped sheet for fitting on cylindrical members having different outer diameters.

3. A filter arrangement as claimed in claim 1, wherein said roll-shaped sheet is formed of a steel sheet spring having the elasticity to allow the inner diameter of the roll-shaped sheet to be changeable.

4. A filter arrangement as claimed in claim 1, wherein said steel sheet is rectangular before being roll-shaped, wherein said roll-shaped sheet has the same inner diameter throughout its length, each of first and second end sections being rectangular and extending in a longitudinal direction of the roll-shaped sheet.

5. A filter arrangement as claimed in claim 1, wherein said first and second end sections of said roll-shaped sheet overlap upon being fitted on the outer peripheral surface of the cylindrical member.

6. A filter arrangement as claimed in claim 1, wherein said first and second end sections of said roll-shaped sheet are in contact with each other.

7. A filter arrangement as claimed in claim 1, wherein said roll-shaped sheet is formed to have, in peripheral direction, a major part of a single layer of said sheet material, and a minor part of a double layer of the first and second end sections.

\* \* \* \* \*